United States Patent
Kollati et al.

(10) Patent No.: US 9,228,440 B2
(45) Date of Patent: Jan. 5, 2016

(54) TURBINE BLADE AIRFOILS INCLUDING SHOWERHEAD FILM COOLING SYSTEMS, AND METHODS FOR FORMING AN IMPROVED SHOWERHEAD FILM COOLED AIRFOIL OF A TURBINE BLADE

(71) Applicant: HONEYWELL INTERNATIONAL INC., Morristown, NJ (US)

(72) Inventors: Vighneswara Rao Kollati, Andhra Pradesh (IN); Balamurugan Srinivasan, Bangalore (IN); Jong Liu, Scottsdale, AZ (US); Daniel Cregg Crites, Mesa, AZ (US); Luis Tapia, Maricopa, AZ (US); Malak Fouad Malak, Tempe, AZ (US); Rajiv Rana, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 461 days.

(21) Appl. No.: 13/692,353

(22) Filed: Dec. 3, 2012

(65) Prior Publication Data
US 2014/0154096 A1    Jun. 5, 2014

(51) Int. Cl.
  *F01D 5/08*    (2006.01)
  *F01D 5/18*    (2006.01)

(52) U.S. Cl.
  CPC ............... *F01D 5/186* (2013.01); *F01D 5/187* (2013.01); *F05D 2260/202* (2013.01); *Y02T 50/676* (2013.01); *Y10T 29/49341* (2015.01)

(58) Field of Classification Search
  CPC .... F01D 5/186; F01D 5/187; F05B 2260/202
  USPC ....................................... 416/97 R
  See application file for complete search history.

(56) References Cited

U.S. PATENT DOCUMENTS

| | | | |
|---|---|---|---|
| 5,370,499 | A | 12/1994 | Lee |
| 5,779,437 | A | 7/1998 | Abdel-Messeh et al. |
| 6,050,777 | A | 4/2000 | Tabbita et al. |
| 6,099,251 | A | 8/2000 | LaFleur |

(Continued)

FOREIGN PATENT DOCUMENTS

EP    0924384 A2    6/1999

OTHER PUBLICATIONS

EP Search Report for Application No. 14164298.3 dated Oct. 24, 2014.

(Continued)

*Primary Examiner* — Edward Look
*Assistant Examiner* — Jason Mikus
(74) *Attorney, Agent, or Firm* — Ingrassia Fisher & Lorenz, P.C.

(57) ABSTRACT

Turbine blade airfoils, showerhead film cooling systems thereof, and methods for cooling the turbine blade airfoils using the same are provided. The airfoil has a leading edge and a trailing edge, a pressure sidewall and a suction sidewall both extending between the leading and the trailing edges, and an internal cavity for supplying cooling air. A showerhead of film cooling holes is connected to the internal cavity. Each film cooling hole has an inlet connected to the internal cavity and an outlet opening onto an external wall surface at the leading edge of the airfoil. A plurality of surface connectors is formed in the external wall surface. Each surface connector of the plurality of surface connectors interconnects the outlets of at least one selected pair of the film cooling holes.

16 Claims, 12 Drawing Sheets

(56) References Cited

U.S. PATENT DOCUMENTS

| | | |
|---|---|---|
| 6,176,676 B1 | 1/2001 | Ikeda et al. |
| 6,955,522 B2 | 10/2005 | Cunha et al. |
| 6,994,521 B2 | 2/2006 | Liang |
| 7,114,923 B2 | 10/2006 | Liang |
| 7,300,252 B2 | 11/2007 | Liang |
| 7,500,823 B2 | 3/2009 | Bolms et al. |
| 7,540,712 B1 | 6/2009 | Liang |
| 7,597,540 B1 | 10/2009 | Liang |
| 7,665,961 B2 | 2/2010 | Lutjen et al. |
| 7,722,327 B1 | 5/2010 | Liang |
| 7,789,626 B1 | 9/2010 | Liang |
| 7,878,761 B1 | 2/2011 | Liang |
| 8,052,390 B1 | 11/2011 | Liang |
| 8,105,030 B2 | 1/2012 | Abdel-Messeh et al. |
| 8,172,505 B2 | 5/2012 | Fujimoto et al. |
| 8,317,473 B1 | 11/2012 | Liang |
| 2008/0095622 A1 | 4/2008 | Naik et al. |
| 2012/0027619 A1 | 2/2012 | Albert et al. |

OTHER PUBLICATIONS

EP Examination Report for Application No. 14164298.3 dated Nov. 7, 2014.

Garg, V. K.: "Heat transfer research on gas turbine airfoils at NASA GRC" International Journal of Heat and Fluid Flow, vol. 23, Issue 2, pp. 109-136 (Apr. 2002).

USPTO Office Action Notification Date Nov. 4, 2015:U.S. Appl. No. 13/871,655.

TURBINE BLADE AIRFOILS INCLUDING SHOWERHEAD FILM COOLING SYSTEMS, AND METHODS FOR FORMING AN IMPROVED SHOWERHEAD FILM COOLED AIRFOIL OF A TURBINE BLADE

TECHNICAL FIELD

The present invention generally relates to gas turbine engines and methods for film cooling of components thereof, and more particularly relates to turbine blade airfoils including showerhead film cooling systems, and methods for forming an improved showerhead film cooled airfoil of a turbine blade.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon blades of a turbine rotor. A rotatable turbine disk or wheel, from which the turbine blades extend, spins at high speeds to produce power. Gas turbine engines used in aircraft use the gas turbine aft end to produce a forward thrust. Other gas turbine engines may use the power to turn a propeller or an electrical generator.

One way to increase cycle efficiency of a gas turbine is to operate at higher turbine inlet temperature (TIT). In most engines, the turbine inlet temperatures have increased well above the metallurgical limit of engine components. Film cooling of gas turbine components (blades and vanes) is a widely used technique that allows higher turbine inlet temperatures by maintaining material temperatures within acceptable limits. With film cooling, air is extracted from the compressor and forced through internal cooling passages within turbine blades and vanes before being ejected through discrete film cooling holes onto the external wall surfaces of the airfoil. The cooling air leaving these film cooling holes forms a film layer of cooling air on the component surface which protects the component from hot gas exiting the combustor by substantially reducing heat transfer from the hot gas to the blade skin as the cooling air is at a lower temperature than the hot gas. Although the aforementioned film cooling systems operate adequately, they may be improved. For example, in the airfoil leading edge region, at lower blowing ratios, the cooling air (also known herein as "coolant") can get carried away by the accelerating mainstream flow of hot gas due to lower coolant radial momentum. At higher blowing ratios, the cooling film may blow-off from the leading edge external wall surface, both scenarios substantially impeding formation of the film layer of cooling air against the airfoil external wall surface, resulting in lower cooling effectiveness.

Accordingly, it is desirable to provide showerhead film cooled components such as turbine blade airfoils, showerhead film cooling systems, and methods for forming an improved showerhead film cooled airfoil of a turbine blade. The improved showerhead film cooling systems may effectively cool components that are typically subjected to elevated operating temperatures, such as those above about 1100° C. In addition, it is desirable for the showerhead film cooling systems to provide better cooling with less cooling air. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine blade airfoils are provided. In accordance with one exemplary embodiment, the airfoil comprises a leading edge and a trailing edge, a pressure sidewall and a suction sidewall both extending between the leading and the trailing edges, and an internal cavity for supplying cooling air. A showerhead of film cooling holes is connected to the internal cavity. Each film cooling hole has an inlet connected to the internal cavity and an outlet opening onto an external wall surface at the leading edge of the airfoil. A plurality of surface connectors is formed on the external wall surface. Each surface connector of the plurality of surface connectors interconnects the outlets of at least one selected pair of the film cooling holes.

Showerhead film cooling systems for an airfoil of a turbine blade are provided in accordance with yet another exemplary embodiment of the present invention. The system comprises a showerhead of film cooling holes arranged in cooling rows at a leading edge of the airfoil. Each film cooling hole has an inlet and an outlet, the outlet opening onto an external wall surface at the leading edge. A plurality of surface connectors on an external wall surface of the airfoil interconnects selected outlets of the film cooling holes to provide a coolant path between them.

Methods are provided for forming an improved showerhead film cooled airfoil of a turbine blade in accordance with yet another exemplary embodiment of the present invention. The method comprises providing an airfoil of a turbine blade having a showerhead of film cooling holes in a leading edge. Each film cooling hole has an inlet and an outlet. The outlet opens onto an external wall surface of the leading edge. A plurality of surface connectors is formed on the external wall surface for interconnecting the outlets of the film cooling holes.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to a showerhead film cooled component such as a turbine blade airfoil, a showerhead film cooling system, and methods for forming an improved showerhead film cooled airfoil of a turbine blade. While this invention is being described showing a particular configured turbine blade as being the preferred embodiment, as one skilled in this art will appreciate, the principles of the present invention can be applied to any other turbine blade that requires internal cooling and could be applied to vanes as well. The showerhead film cooling system according to exemplary embodiments could be used for a stator vane or a rotor blade to provide film cooling for the leading edge of the airfoil that is exposed to a hot gas flow. In accordance with exemplary embodiments, the airfoil of a turbine blade includes a showerhead of film cooling holes having outlets that are interconnected by integrally formed surface connectors that help retain the cooling air radial momentum (i.e., the velocity at which the cooling air is ejected out from the film cooling hole outlet at an airfoil leading edge) to allow formation of a film layer against the airfoil external wall surface regardless of the blowing ratio and to substantially prevent blow-off (i.e., separation of the cooling film from the external wall surface). As used herein, the term "blowing ratio", M, is the ratio of the coolant mass flux to the mainstream gas mass flux and is defined as follows: $M = P_c U_c / P_m U_m$, where $P_c$ and $P_m$ are the coolant and mainstream density, respectively, and $U_c$ and $U_m$ are the coolant and mainstream velocity, respectively. Without the surface connectors, at lower blowing ratios, the cooling air (also known herein as "coolant") can get carried away by the accelerating mainstream flow of hot gas due to lower coolant radial momentum.

Figure 1:
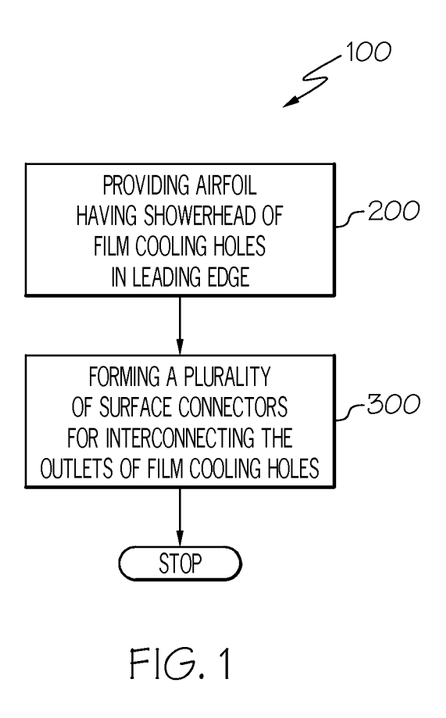
FIG. 1 is a flow diagram of a method for forming an improved showerhead film cooled airfoil of a turbine blade, according to an exemplary embodiment of the present invention.
Figure 2:
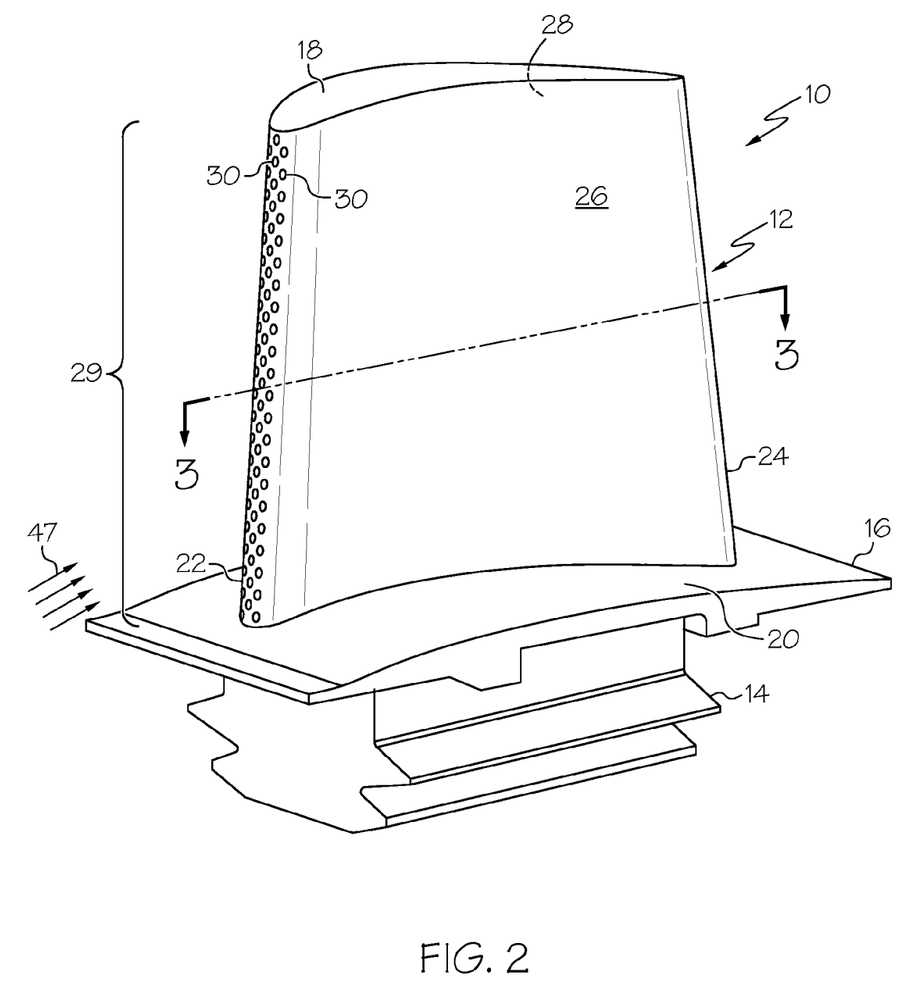
FIG. 2 is an isometric view of an exemplary prior art turbine blade including an airfoil having a showerhead of film cooling holes at the airfoil leading edge.
Figure 8:
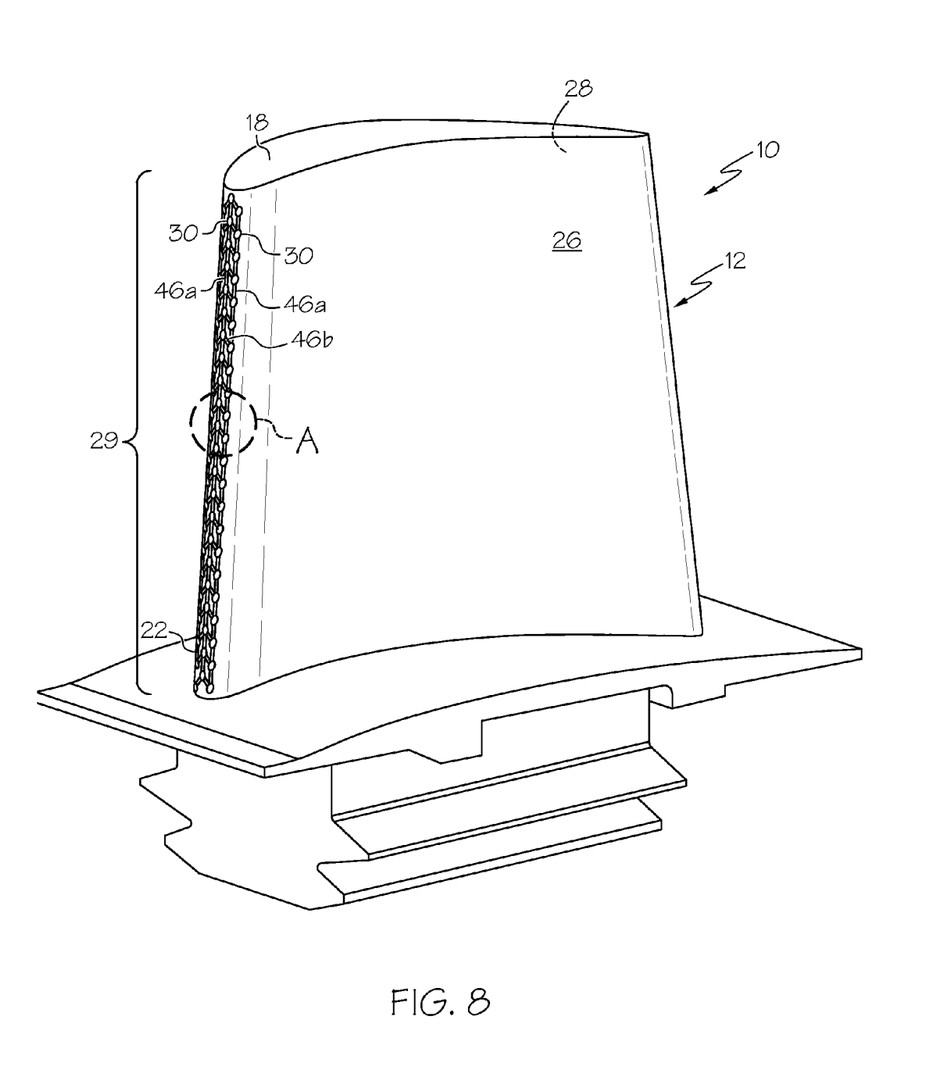
FIG. 8 is an isometric view of an exemplary turbine blade including an improved showerhead film cooled airfoil, the showerhead film cooled airfoil having a showerhead of film cooling holes at a leading edge, each film cooling hole having an outlet opening onto an external wall surface at the airfoil leading edge and the outlets interconnected by a plurality of surface connectors, according to an exemplary embodiment of the present invention.

Referring now to FIGS. 1 through 3A, in accordance with exemplary embodiments, a method 100 for forming an improved showerhead film cooled airfoil of a turbine blade such as shown in FIG. 8 begins by providing a turbine blade airfoil 12 such as shown in FIG. 2 having a showerhead of film cooling holes (the "showerhead" identified with numeral 29) in a leading edge 22 (step 200). FIG. 2 illustrates an exemplary turbine blade 10 for a gas turbine engine (not shown). The turbine blade 10 comprises the airfoil 12 and a fir-tree attachment 14 including a platform 16. The airfoil includes a tip 18, a root 20, the leading edge 22, a trailing edge 24, a pressure sidewall 26 and a suction sidewall 28 both extending between the leading edge and the trailing edge. The showerhead 29 comprises a plurality of film cooling holes 30 forming an array of cooling rows 32, 34, and 36 (FIG. 3) disposed about the leading edge 22. Each film cooling hole 30 has an inlet 38 connected to an internal cavity 40 (FIG. 3) that supplies cooling air and an outlet 42 opening onto an external wall surface 44 at the leading edge of the airfoil 12.

Figure 3:
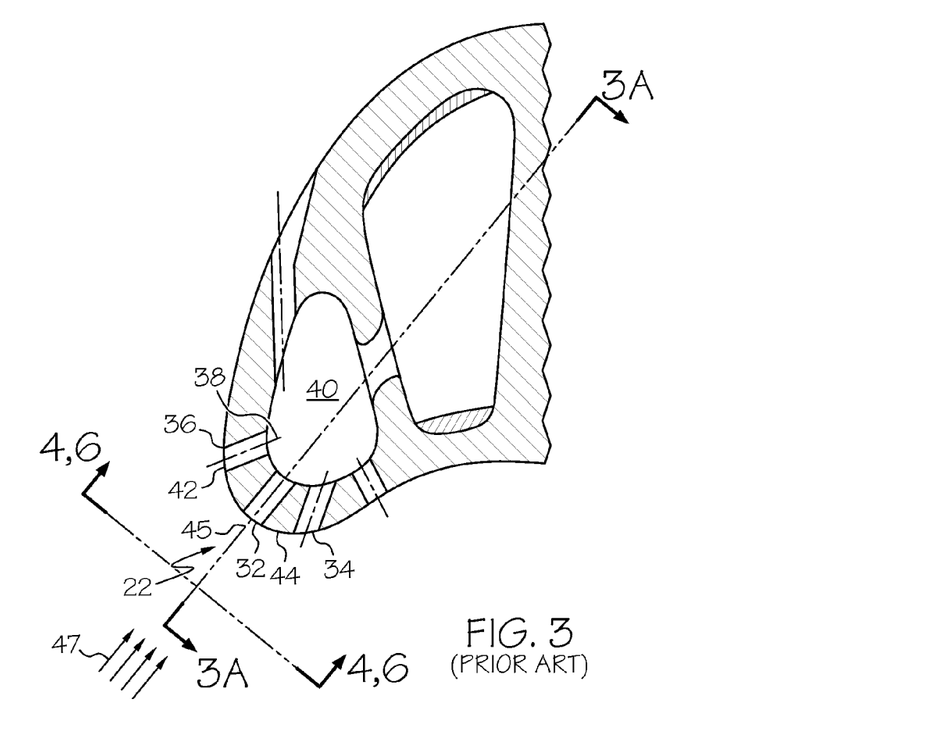
FIG. 3 is a cross sectional top view of the airfoil leading edge of the exemplary prior art turbine blade of FIG. 2.
Figure 3A:
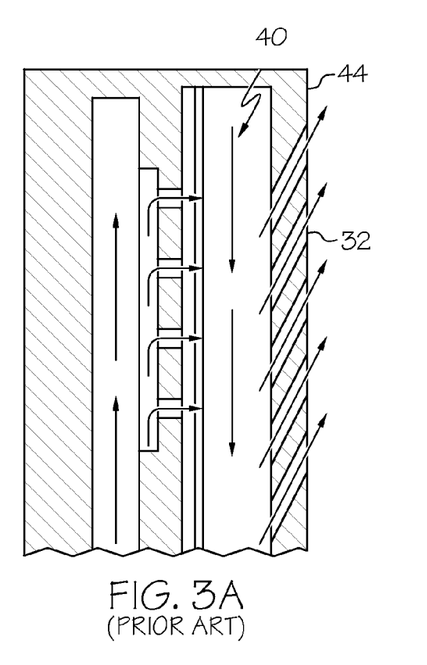
FIG. 3A is a cross sectional side view of the airfoil leading edge of the exemplary prior art turbine blade of FIG. 2.

Referring still to FIG. 3 and now to FIGS. 4 through 7, the showerhead of film cooling holes comprises at least three rows of film cooling holes. A first row 32 of the at least three rows comprises a first plurality of film cooling holes extending in a span-wise direction of the airfoil and is located substantially along a geometric stagnation line 45 (FIG. 3) of the leading edge. A second row 34 comprising a second plurality of film cooling holes extends in a span-wise direction of the airfoil and on the pressure side of the stagnation line at the leading edge; a third row 36 of a third plurality of film cooling holes extends in a span-wise direction of the airfoil and on the suction side of the stagnation line at the leading edge. The rows 32, 34, and 36 of film cooling holes extend from the root of the blade toward the tip 18 (FIG. 2) (i.e., in the "span-wise direction"). The film cooling holes are arranged symmetrically with respect to a mainstream gas flow 47 (FIGS. 2 and 3), at circumferential positions 0°, −30 to −15°, and 15 to 30°, and a hole spacing (center of one film cooling hole to the center of the sequential film cooling hole) of p/d=3 to 7 in the span-wise direction. The film cooling holes of all three rows are oriented substantially perpendicular to the mainstream gas flow 47 and with a significant radial component (45° or more) comprising the hot gas exiting the combustor (not shown) of the gas turbine engine (not shown). Each of rows 34 and 36 is staggered in the span-wise direction relative to row 32 and horizontally aligned with respect to each other. It is to be understood that rows may be staggered in other relationships and may also or alternatively be aligned relative to other rows. FIG. 3A shows a side cross section view of the showerhead cooling holes through line 3A-3A of FIG. 3.

Figure 4:
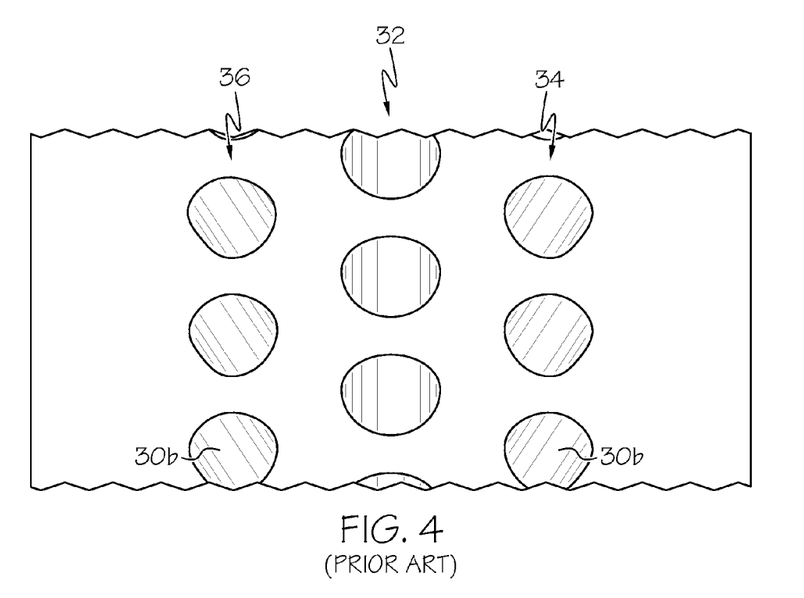
FIG. 4 is a partial front view of the airfoil leading edge of FIG. 3 taken along line 4,6, illustrating a portion of the showerhead of film cooling holes arranged in cooling rows, the film cooling holes being diffusive film cooling holes and each having an outlet opening onto an external wall surface at the airfoil leading edge.
Figure 5A:
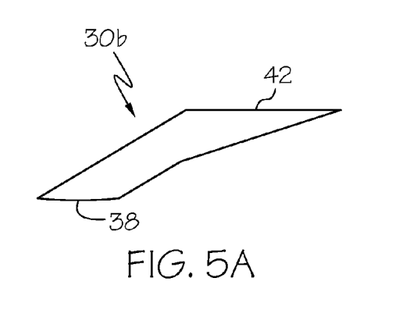
FIGS. 5A and 5B are isometric views of a diffusive film cooling hole.
Figure 5B:
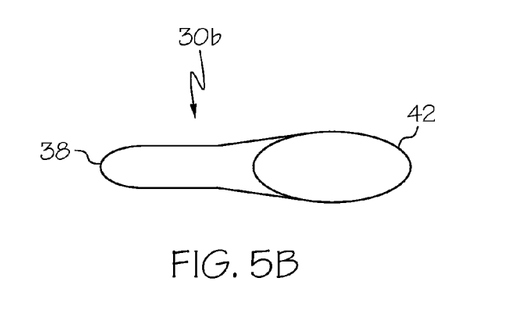
Figure 6:
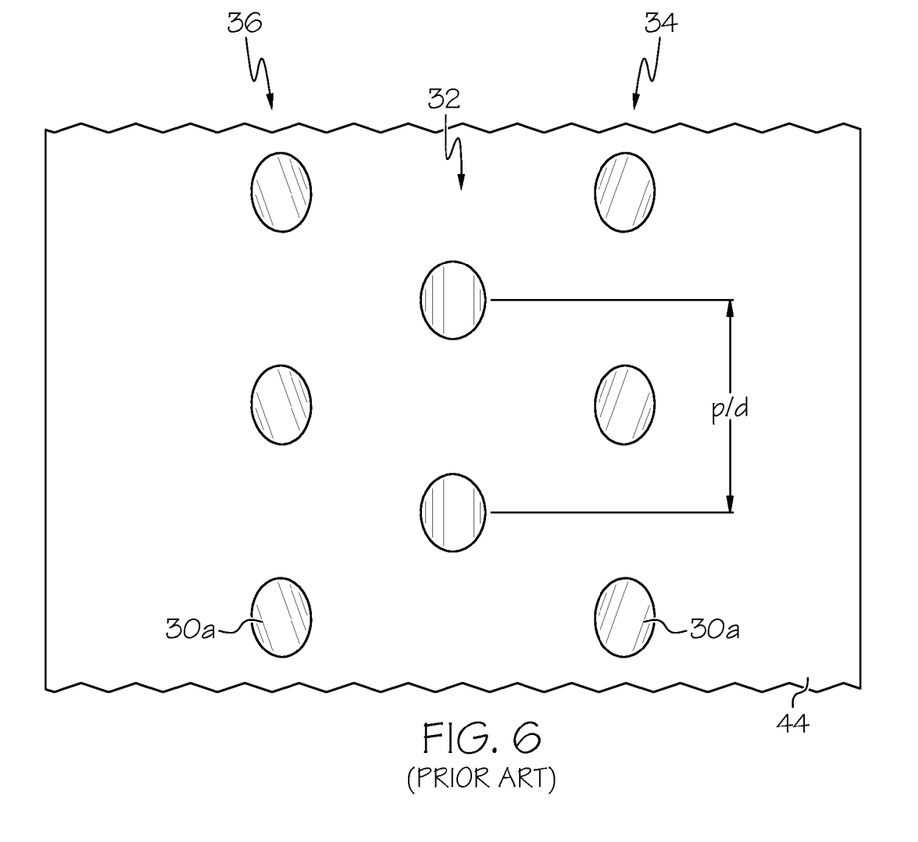
FIG. 6 is a partial front view similar to FIG. 4 of the airfoil leading edge of FIG. 3 taken along line 4, 6, illustrating a portion of the showerhead of film cooling holes arranged in cooling rows, the film cooling holes being substantially cylindrical and having an outlet opening onto the external wall surface at the airfoil leading edge.
Figure 7:
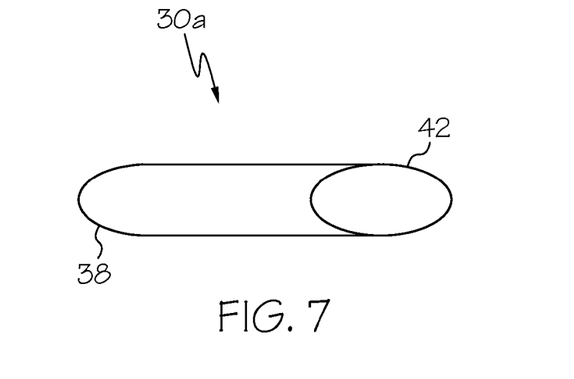
FIG. 7 is an isometric view of a substantially cylindrical film cooling hole.

The film cooling holes 30 may be substantially cylindrical as shown in FIGS. 6 and 7 (hereinafter "cylindrical film cooling holes 30a"). Alternatively, the film cooling holes may be cylindrical with a flared diffuser section at the outlet or discharge thereof (hereinafter a "diffusive film cooling hole 30b") as shown in FIGS. 4 through 5B. The showerhead of film cooling holes may also comprise combinations of cylindrical film cooling holes, diffusive film cooling holes, and film cooling holes of other shapes, geometries, and configurations as known in the art.

While specific showerhead and film cooling hole geometries and configurations have been described, it is to be understood that the exemplary embodiments as hereinafter described are not limited to any particular showerhead and film cooling hole geometries and/or configurations. For example, the film cooling hole shape, dimensions, injection and/or compound angle, the hole spacing (p/d) between film cooling holes, the spacing between rows of film cooling holes, the number of rows, or the like may be varied depending upon the particular application. The array of rows may also be in other patterns predicated on the particular engine application.

Referring again to FIGS. 1 and 8 and now to FIGS. 9 to 14, according to exemplary embodiments, method 100 continues by forming a plurality of surface connectors 46a and/or 46b on the external wall surface 44 of the airfoil 12, each surface connector interconnecting the outlets 42 of the film cooling holes (step 300). Each surface connector comprises a groove or channel integrally formed in the leading edge blade material on the external wall surface 44 of the airfoil. The plurality of surface connectors may be integrally cast into the airfoil leading edge during a casting process for the turbine blade. The surface connectors may alternatively be formed by machining them into the leading edge blade material. While the methods described herein for forming the connectors involve machining and/or casting, it is to be understood that other surface connector-forming methods may be used. The depth (D) of each surface connector is about 0.25 to about 0.5 of the diameter (d) of the film cooling hole, but other diameter (d) to depth (D) ratios (d/D) may be used. Each surface connector extends between the outlets 42 of a selected pair of film cooling holes 30b for fluid communication therebetween. While the surface connectors in FIGS. 8 through 12 and 14a through 14e are illustrated as interconnecting the outlets of diffusive film cooling holes 30b, it is to be understood that the plurality of surface connectors may interconnect the outlets of cylindrical film cooling holes 30a (e.g., FIG. 13), or film cooling holes of other shapes. Encircled region A of FIG. 8 shows a portion of the airfoil leading edge 22. Surface connectors are shown generically in encircled region A of FIG. 8 for purposes of illustration only.

Figure 9:
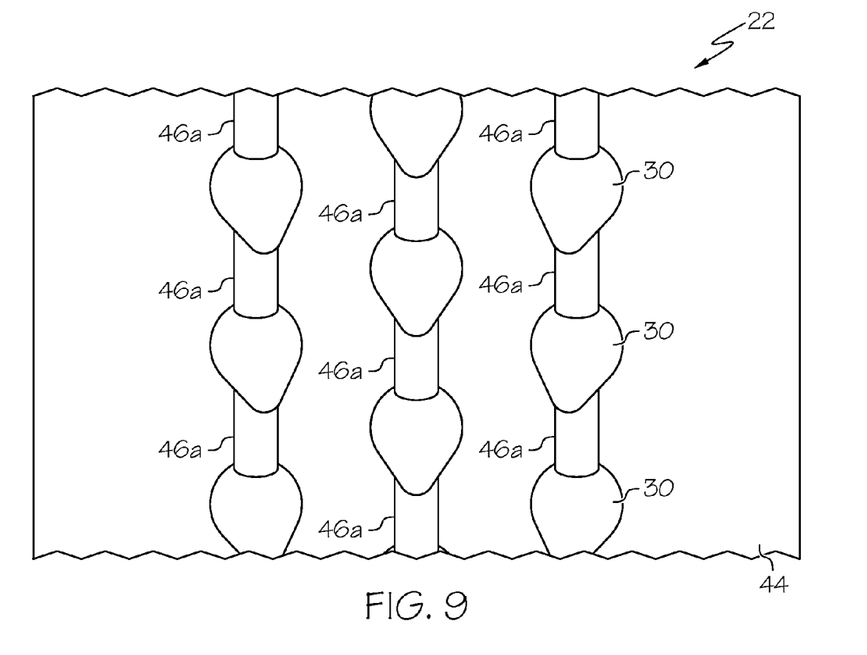
FIG. 9 is an enlarged view of encircled region A of the improved showerhead film cooled airfoil of FIG. 8, the outlets of exemplary diffusive film cooling holes opening onto the external wall surface and into a plurality of span-wise connectors interconnecting the outlets in the same cooling row, according to exemplary embodiments of the present invention.

The plurality of surface connectors comprises span-wise connectors 46a (FIGS. 9, and 12 through 14b)), both span-wise connectors 46a and cross-wise connectors 46b (FIG. 10), or cross-wise connectors 46b (FIGS. 11, 14C through 14E). "Span-wise connectors" 46a extend in a span-wise direction between the outlets 42 of a selected pair of sequential film cooling holes within the same cooling row. Each of the span-wise connectors 46a has a first end to be disposed at the outlet of a film cooling hole and a second end to be disposed at the outlet of a sequential film cooling hole in the same row. FIG. 9 is an enlarged view of the encircled region A of FIG. 8, with the film cooling holes 30 opening onto the external wall surface 44 with the plurality of span-wise connectors 46a interconnecting the outlets 42 of selected sequential pairs of diffusive film cooling holes in the same row in the span-wise direction.

Figure 10:
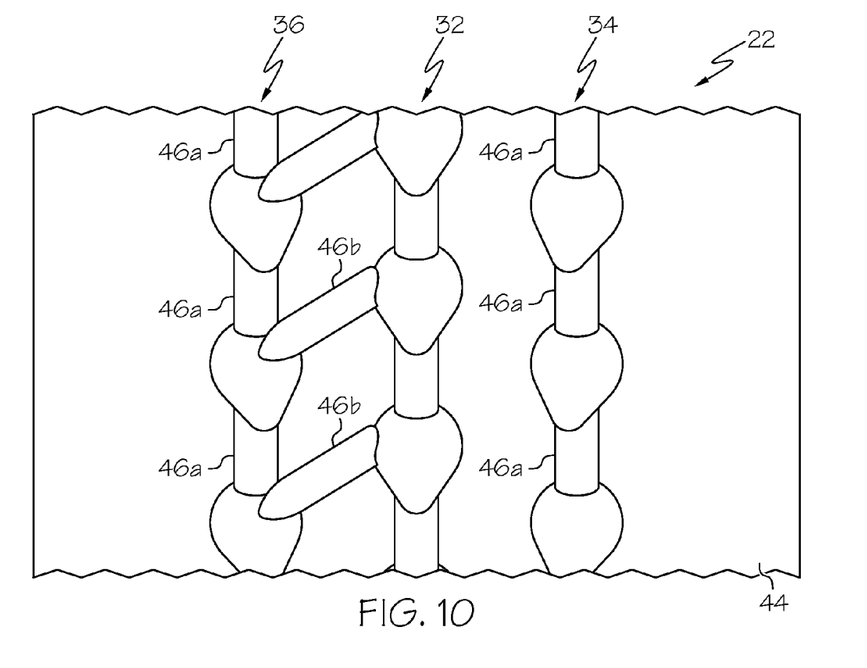
FIG. 10 is an enlarged view of encircled region A of the improved showerhead film cooled airfoil of FIG. 8, with the span-wise connectors and with cross-wise connectors extending and inclined upwardly between diffusive cooling holes in a suction sidewall at the leading edge and respective adjacent diffusive cooling holes at a stagnation line of the airfoil, according to exemplary embodiments of the present invention.
Figure 11:
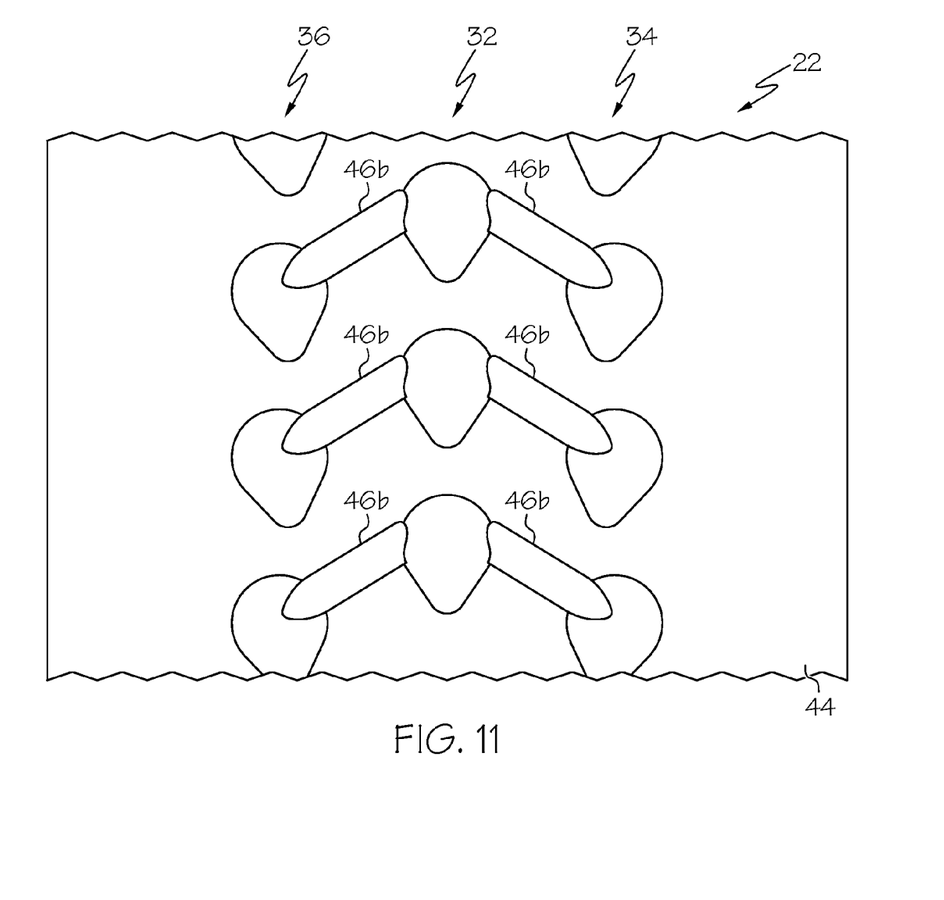
FIG. 11 is an enlarged view of encircled region A of the improved showerhead film cooled airfoil of FIG. 8, the improved showerhead film cooled airfoil having a showerhead film cooling system including a showerhead of film cooling holes at the airfoil leading edge with cross-wise connectors extending and inclined upwardly between diffusive cooling holes on the suction sidewall and the pressure sidewall at the leading edge and adjacent diffusive cooling holes at the stagnation line of the airfoil, according to exemplary embodiments of the present invention.
Figure 12:
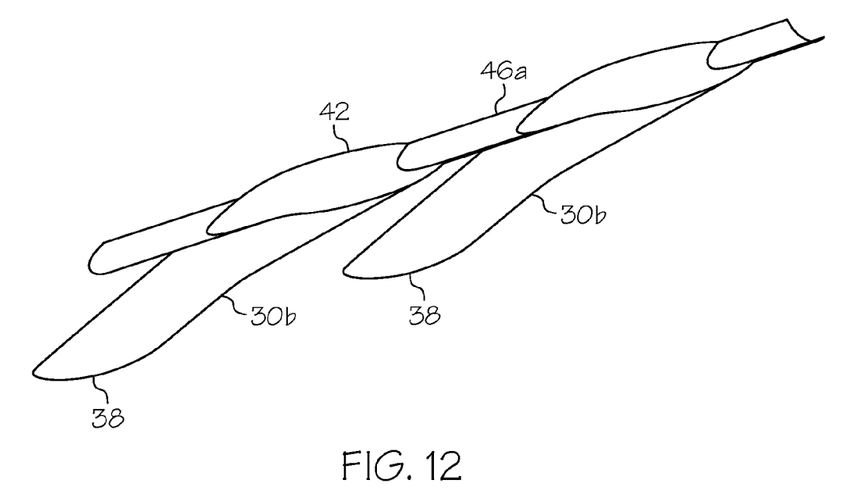
FIG. 12 is an isolation (isometric) view illustrating a span-wise connector extending between the outlets of a pair of diffusive cooling holes in a single row of diffusive film cooling holes.
Figure 13:
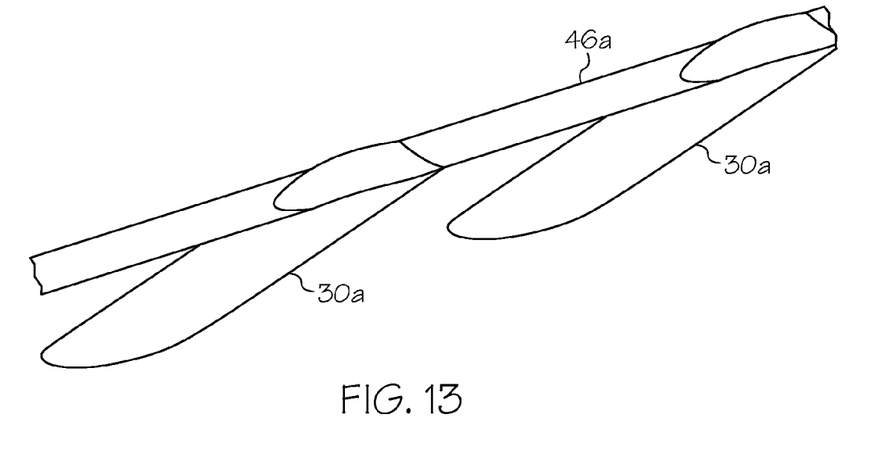
FIG. 13 is an isolation (isometric) view similar to FIG. 12 of a span-wise connector extending between the outlets of a pair of cylindrical film cooling holes in a single row of substantially cylindrical film cooling holes.
Figure 14A:
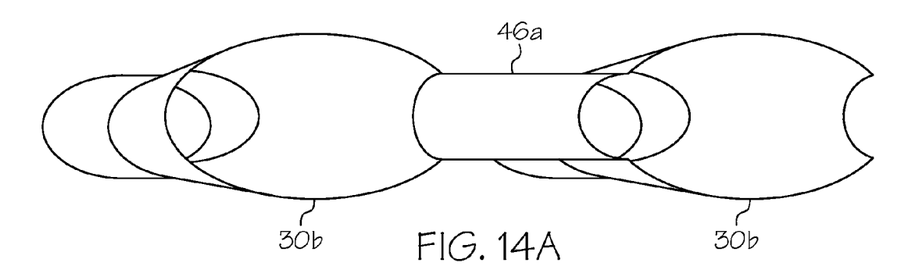
FIGS. 14A through 14E are isolation (isometric) views similar to FIGS. 12 and 13 of surface connectors (both span-wise and cross-wise connectors) extending between the outlets of diffusive film cooling holes.
Figure 14B:
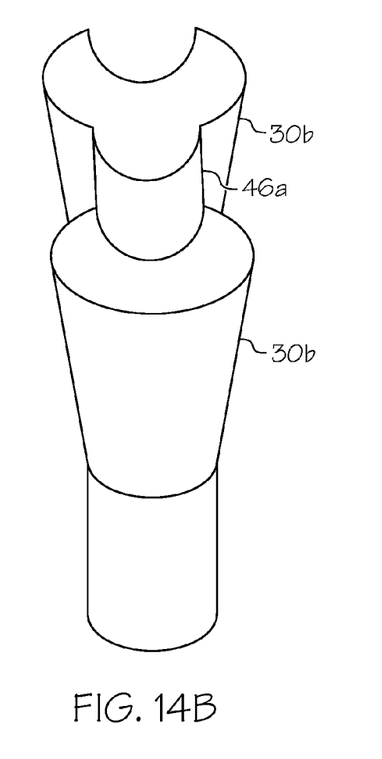
Figure 14C:
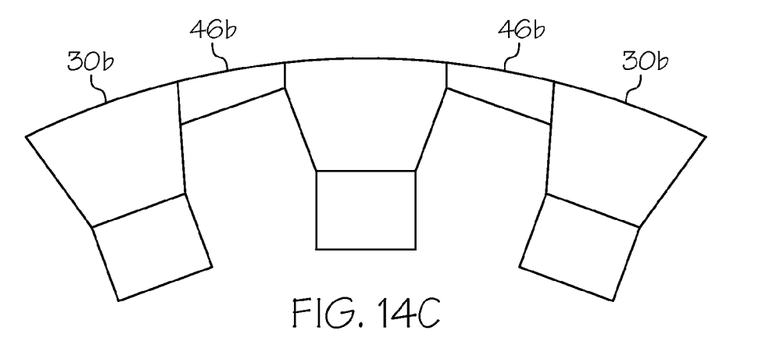
Figure 14D:
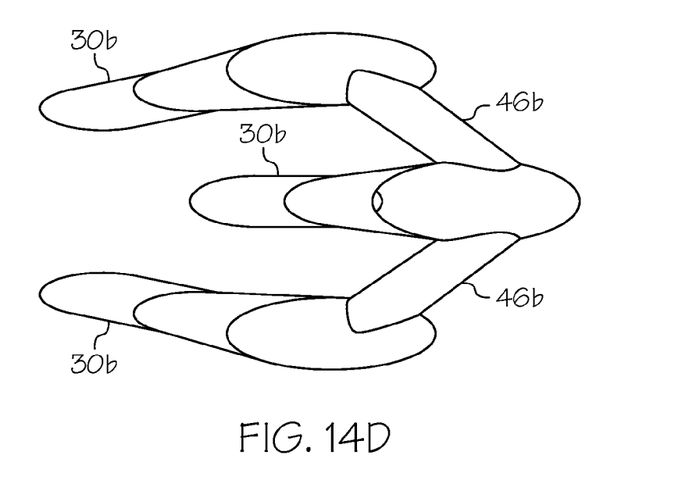
Figure 14E:
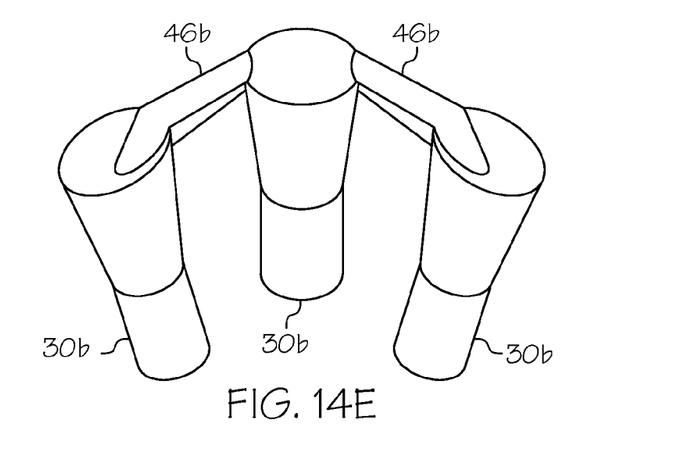

"Cross-wise connectors" 46b extend between the outlets of film cooling holes in adjacent rows. The cross-wise connectors may be inclined if the adjacent rows are staggered. For example, FIG. 11 is an enlarged view of the encircled region A of FIG. 8, with the film cooling holes 30 opening onto the external wall surface 44, with cross-wise connectors 46b extending between the outlets of film cooling holes in the suction sidewall cooling row 36 and the outlets of film cooling holes at the stagnation line 45. Each cross-wise connector inclines upwardly to the outlet of the film cooling hole at the stagnation line. As illustrated in FIG. 11, the cross-wise connectors may alternatively or additionally extend between the outlets of the film cooling holes in the pressure sidewall cooling row 34 and the adjacent outlets of film cooling holes at the stagnation line. FIG. 10 is another enlarged view of the encircled region A of FIG. 8, with the film cooling holes 30 opening onto the external wall surface 44, with a combination of span-wise and cross-wise connectors extending between adjacent outlets of the film cooling holes. FIG. 12 illustrates a pair of diffusive film cooling holes 30b in isolation connected by a span-wise connector 46a and FIG. 13 illustrates a pair of cylindrical film cooling holes 30a in isolation connected by a span-wise connector 46a.

Figure 15:
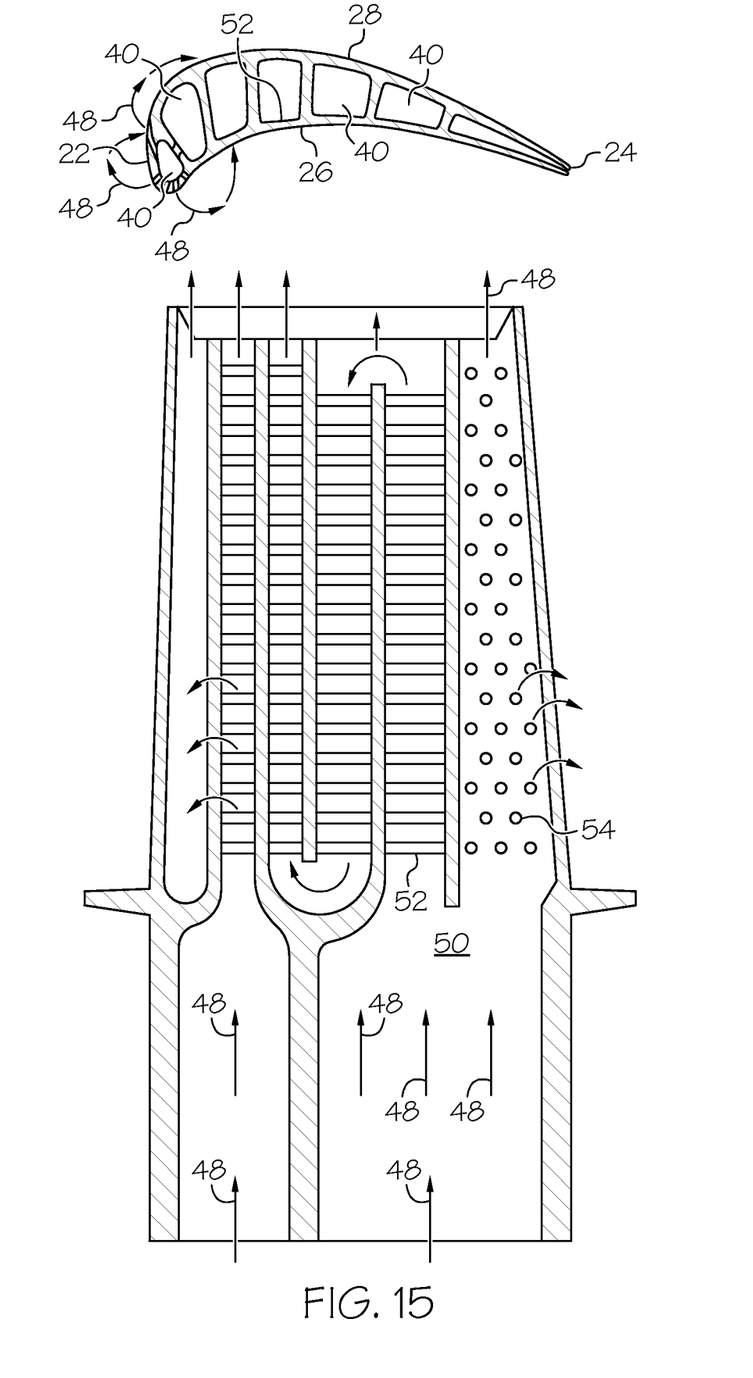
FIG. 15 is a sectional view of the turbine blade illustrating a coolant flowpath.

Referring now to FIG. 15, according to exemplary embodiments, cooling air 48 is supplied through the internal cavity and flows into the leading edge showerhead film cooling system 29. The cooling air 48 is supplied through the showerhead of film cooling holes at the airfoil leading edge which is then discharged into the plurality of surface connectors 46a and/or 46b (not shown in FIG. 15) formed on the external wall surface. The cooling air is diffused into the film cooling holes and interconnected surface connectors, forming a film layer of cooling air on the external wall surface 44 at the leading edge 22 of the airfoil. As known in the art, the cooling air 48 is supplied to the internal cavity 40 from a passage 50 formed in the bottom of the fir tree attachment and as is typical in many turbine cooling installations, the coolant is supplied by the engine's compressor (not shown). There may be turbulence promoters 52 and pin fins 54 in the coolant flowpath through the turbine blade.

The plurality of surface connectors help retain the coolant radial (span-wise) momentum and substantially prevent blow-off so that the heat transfer from the hot gas flow to the turbine blade skin is reduced, thereby improving cooling of at least the leading edge of the airfoil. Overall airfoil cooling may also be improved by using the plurality of surface connectors. In addition, while cooling at the leading edge external wall surface has been described, it is to be understood that the surface connectors according to exemplary embodiments may be used to connect cooling holes that are disposed at other than the leading edge, to retain coolant momentum and increase cooling effectiveness.

EXAMPLES

The examples are provided for illustration purposes only, and are not meant to limit the various embodiments of the present invention in any way. The improvement in area averaged cooling effectiveness of the leading edge in the improved showerhead film cooled airfoil of the turbine (FIG. 8) using the showerhead film cooling system with interconnected cylindrical film cooling holes according to exemplary embodiments over a conventional showerhead film cooling system having non-connected (i.e., no surface connectors) cylindrical film cooling holes ("baseline cylindrical") is shown in Table 1 below for varying blowing ratios (BR):

TABLE 1

| | | Area averaged effectiveness | | | % improvement | |
|---|---|---|---|---|---|---|
| | BR | baseline cylindrical | span-wise connectors | span-wise & cross connectors | span-wise connectors | span-wise & cross connectors |
| leading surf | 1.0 | 0.377 | 0.435 | 0.400 | 15.6 | 6.1 |
| | 2.0 | 0.378 | 0.477 | 0.485 | 26.0 | 28.2 |
| | 3.0 | 0.313 | 0.388 | 0.358 | 24.0 | 14.4 |
| | 4.0 | 0.298 | 0.372 | 0.367 | 24.8 | 23.2 |
| overall blade | 1.0 | 0.120 | 0.124 | 0.121 | 4.1 | 1.7 |
| | 2.0 | 0.166 | 0.176 | 0.176 | 5.9 | 5.9 |
| | 3.0 | 0.174 | 0.181 | 0.178 | 4.5 | 2.4 |
| | 4.0 | 0.198 | 0.204 | 0.210 | 2.8 | 6.0 |

The improvement in area averaged cooling effectiveness of the leading edge and the overall airfoil using the showerhead film cooling system with interconnected diffusive film cooling holes according to exemplary embodiments over a conventional showerhead film cooling system having non-connected (i.e., no surface connectors) diffusive film cooling holes ("baseline diffusive") is shown in Table 2 below for varying blowing ratios:

TABLE 2

| | | Area averaged effectiveness | | | % improvement | |
|---|---|---|---|---|---|---|
| | BR | baseline diffusive | span-wise connectors | span-wise & cross connectors | span-wise connectors | span-wise & cross connectors |
| leading surf | 1.0 | 0.468 | 0.521 | 0.537 | 11.4 | 14.7 |
| | 2.0 | 0.627 | 0.702 | 0.710 | 11.8 | 13.2 |
| | 3.0 | 0.707 | 0.775 | 0.783 | 9.6 | 10.8 |
| | 4.0 | 0.762 | 0.808 | 0.808 | 6.0 | 5.9 |
| overall blade | 1.0 | 0.126 | 0.130 | 0.132 | 3.5 | 4.6 |
| | 2.0 | 0.197 | 0.202 | 0.202 | 2.1 | 2.4 |
| | 3.0 | 0.242 | 0.248 | 0.249 | 2.4 | 2.9 |
| | 4.0 | 0.274 | 0.275 | 0.274 | 0.3 | 0.0 |

From the foregoing, it is to be appreciated that improved showerhead film cooled components such as turbine blade airfoils, showerhead film cooling systems, and methods for forming the improved showerhead film cooled airfoil of the turbine blade have been provided. The improved showerhead film cooling systems may effectively cool components that are typically subjected to elevated operating temperatures, such as those above about 1100° C. The cooling air radial momentum is retained by the interconnected surface connectors, thereby improving cooling effectiveness at lower blowing ratios and substantially preventing blow-off at the leading edge external wall surface at higher blowing ratios. This results in better cooling of the airfoil leading edge and overall airfoil, permitting higher turbine inlet temperatures and longer turbine blade life.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil of a turbine blade, the airfoil comprising:
   a leading edge and a trailing edge;
   a pressure sidewall and a suction sidewall both extending between the leading and the trailing edges;
   an internal cavity for supplying cooling air;
   a showerhead of film cooling holes connected to the internal cavity, each film cooling hole having an inlet connected to the internal cavity and a flared diffuser section at an outlet opening onto an external wall surface at the leading edge of the airfoil; and
   a plurality of surface connectors formed on the external wall surface, each surface connector of the plurality of surface connectors interconnecting only the outlets of a selected pair of the film cooling holes.

2. The airfoil of claim 1, wherein the showerhead of film cooling holes comprises at least three rows of film cooling holes with one of the rows comprising a first plurality of film cooling holes extending in a span-wise direction of the airfoil and located substantially along a stagnation line of the leading edge, the at least three rows of film cooling holes further comprising:
   a second plurality of film cooling holes extending in a span-wise direction of the airfoil and in the pressure sidewall at the leading edge; and
   a third plurality of film cooling holes extending in a span-wise direction of the airfoil and in the suction sidewall at the leading edge.

3. The airfoil of claim 2, wherein the first plurality of film cooling holes is staggered in the span-wise direction from the second and third plurality of film cooling holes, the second and third plurality of film cooling holes being substantially horizontally aligned.

4. The airfoil of claim 2, wherein the plurality of surface connectors is selected from the group consisting of span-wise connectors, cross-wise connectors, and both span-wise and cross-wise connectors.

5. The airfoil of claim 4, wherein each span-wise connector extends in a span-wise direction between only the outlets of the selected pair of the film cooling holes, the selected pair of the film cooling holes comprising sequential film cooling holes within the same cooling row.

6. The airfoil of claim 4, wherein each cross-wise connector extends only between adjacent outlets of the selected pair of film cooling holes in adjacent cooling rows.

7. The airfoil of claim 4, wherein each cross-wise connector extends between only the outlet of a film cooling hole in the pressure sidewall at the leading edge and the outlet of an adjacent film cooling hole at the stagnation line, between only the outlet of the a film cooling hole in the suction sidewall at the leading edge and the outlet of the adjacent film cooling hole at the stagnation line, or both.

8. A showerhead film cooling system for an airfoil of a turbine blade, the system comprising:
   a showerhead of film cooling holes arranged in cooling rows at a leading edge of the airfoil, each film cooling hole having an inlet and a flared diffuser section at an outlet, the outlet opening onto an external wall surface at the leading edge, the showerhead of film cooling holes including at least three rows of film cooling holes with one of the rows comprising a first plurality of film cooling holes extending in a span-wise direction of the airfoil and located substantially along a stagnation line of the leading edge, one of the rows comprising a second plurality of film cooling holes extending in a span-wise direction of the airfoil and in the pressure sidewall at the leading edge and one of the rows comprising a third plurality of film cooling holes extending in a span-wise direction of the airfoil and in the suction sidewall at the leading edge; and
   a plurality of surface connectors on the external wall surface of the airfoil for interconnecting selected outlets of the film cooling holes to provide a coolant path between them,
   wherein the plurality of surface connectors comprise a plurality of span-wise connectors that each extend in a span-wise direction only between the outlets of the selected pair of the film cooling holes, the selected pair of the film cooling holes comprising sequential film cooling holes within the same cooling row.

9. The showerhead film cooling system of claim 8, wherein the first plurality of film cooling holes is staggered in the span-wise direction from the second and third plurality of film cooling holes, the second and third plurality of film cooling holes being substantially horizontally aligned.

10. The showerhead film cooling system of claim 9, wherein the plurality of surface connectors further comprise cross-wise connectors that interconnect only selected outlets of the film cooling holes.

11. The showerhead film cooling system of claim 10, wherein each cross-wise connector extends between adjacent outlets of the selected pair of film cooling holes in adjacent cooling rows.

12. The showerhead film cooling system of claim 11, wherein each cross-wise connector extends between only the outlet of a film cooling hole in the pressure sidewall at the leading edge and the adjacent outlet of a film cooling hole at the stagnation line, between only the outlet of the film cooling hole in the suction sidewall at the leading edge and the adjacent outlet of the film cooling hole at the stagnation line, or both.

13. A method of forming an improved showerhead film cooled airfoil of a turbine blade comprising the steps of:
   forming an airfoil of a turbine blade having a showerhead of film cooling holes in a leading edge, each film cooling hole having an inlet and a flared diffuser section at an outlet, the outlet opening onto an external wall surface of the leading edge and each film cooling hole including a radial component greater than forty-five degrees; and
   forming a plurality of surface connectors on the external wall surface for interconnecting only the outlets of at least one selected pair of film cooling holes,
   wherein the step of forming a plurality of surface connectors comprises forming a plurality of span-wise connectors, each span-wise connector extending in a span-wise direction only between the outlets of a selected pair of sequential film cooling holes within a cooling row.

14. The method of claim 13, wherein the step of forming a plurality of surface connectors comprises forming a plurality of cross-wise connectors, each cross-wise connector extending only between adjacent outlets of a selected pair of adjacent film cooling holes in adjacent rows.

15. The method of claim 13, wherein a first plurality of film cooling holes at a stagnation line is staggered from a second and a third plurality of film cooling holes, and wherein the step of forming a plurality of surface connectors comprises forming a plurality of cross-wise connectors, each cross-wise connector extending and inclined between the outlet of a film cooling hole in the pressure sidewall at the leading edge, in the suction sidewall at the leading edge, or both and the outlet of an adjacent film cooling hole at the stagnation line.

16. The method of claim 13, wherein the step of forming a plurality of surface connectors comprises integrally forming the plurality of surface connectors in a material of the turbine blade at the leading edge.

* * * * *